Patented Dec. 19, 1939

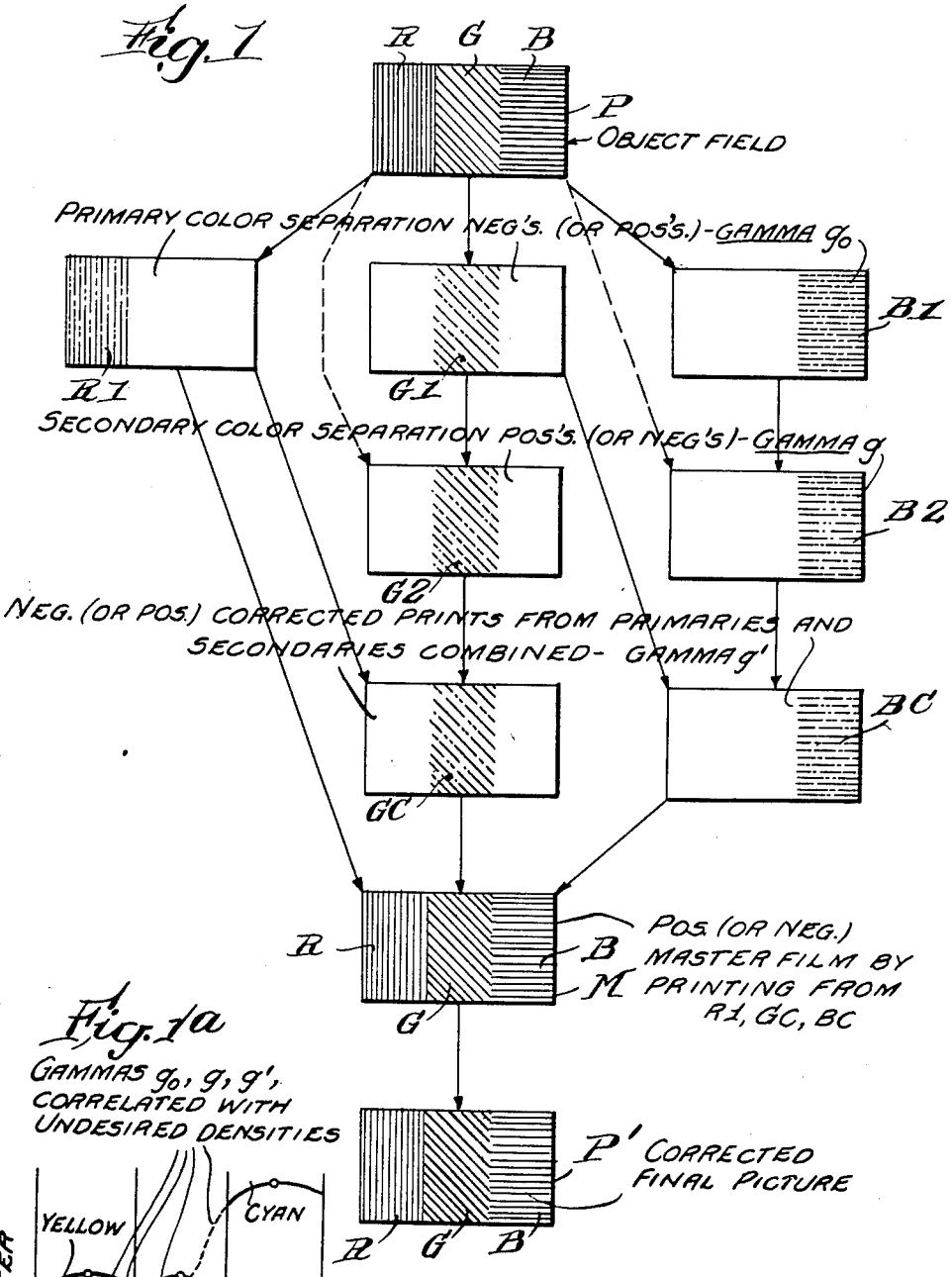
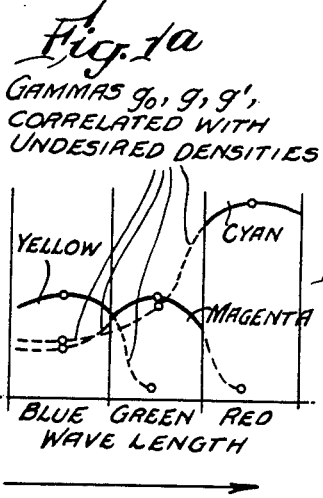

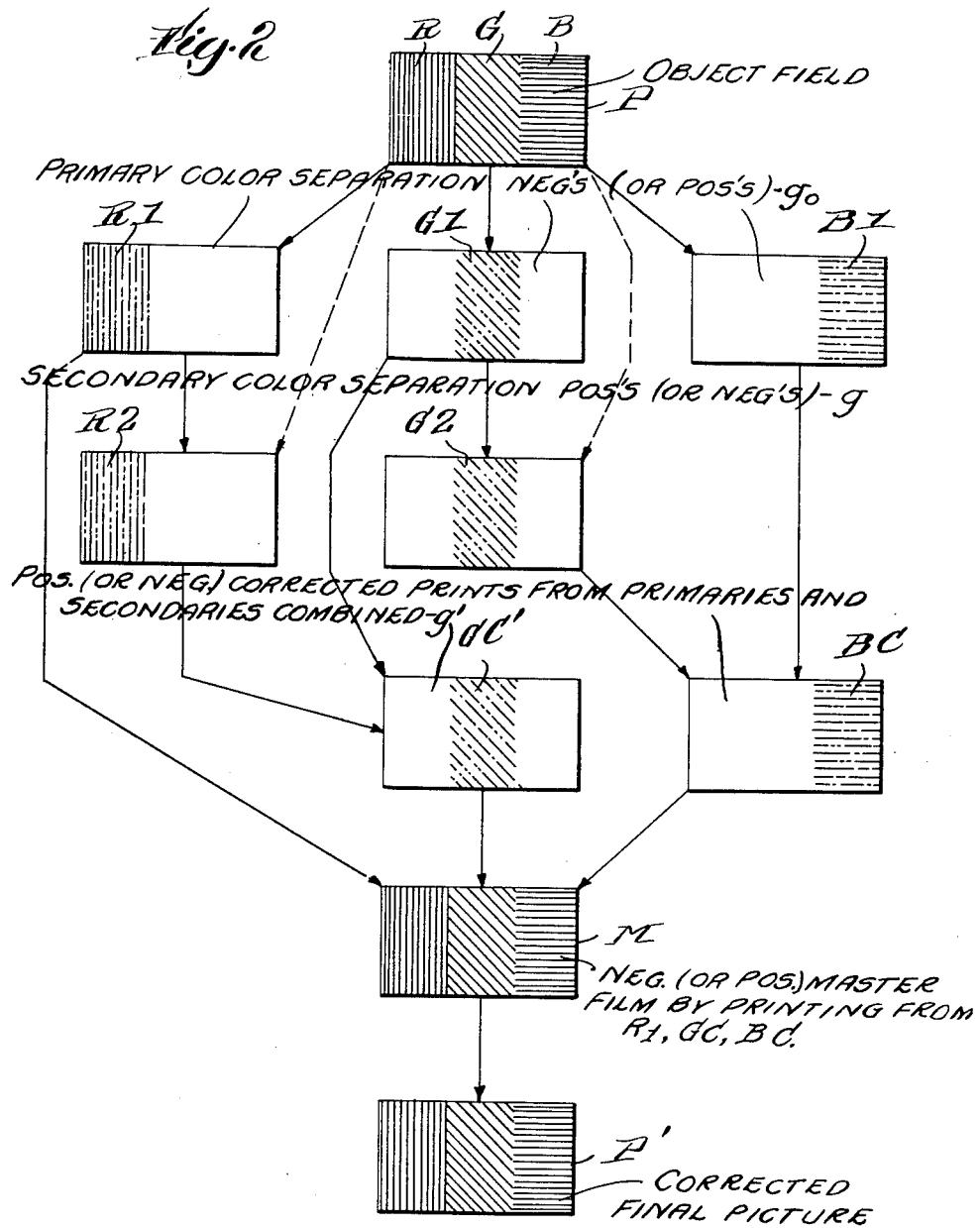

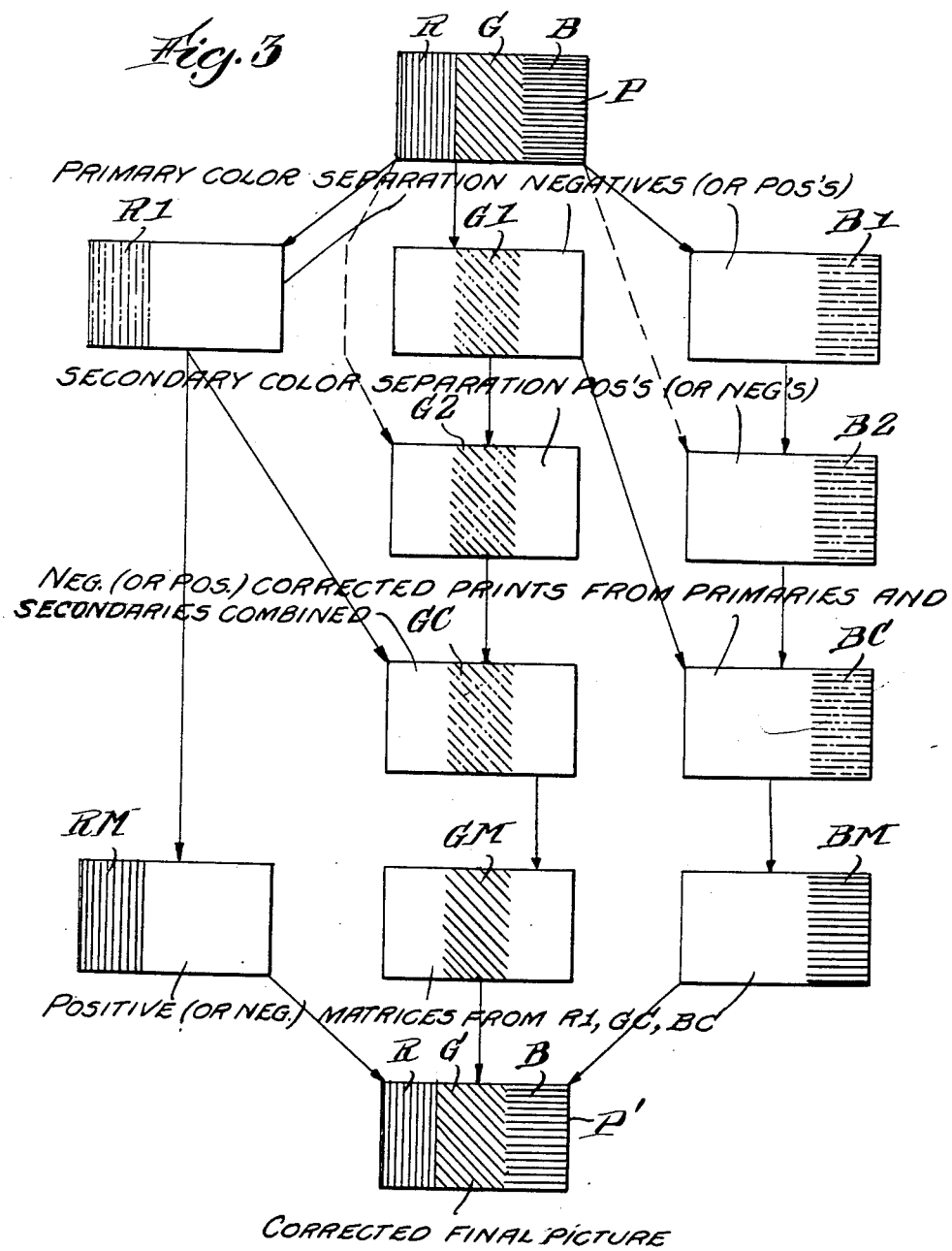

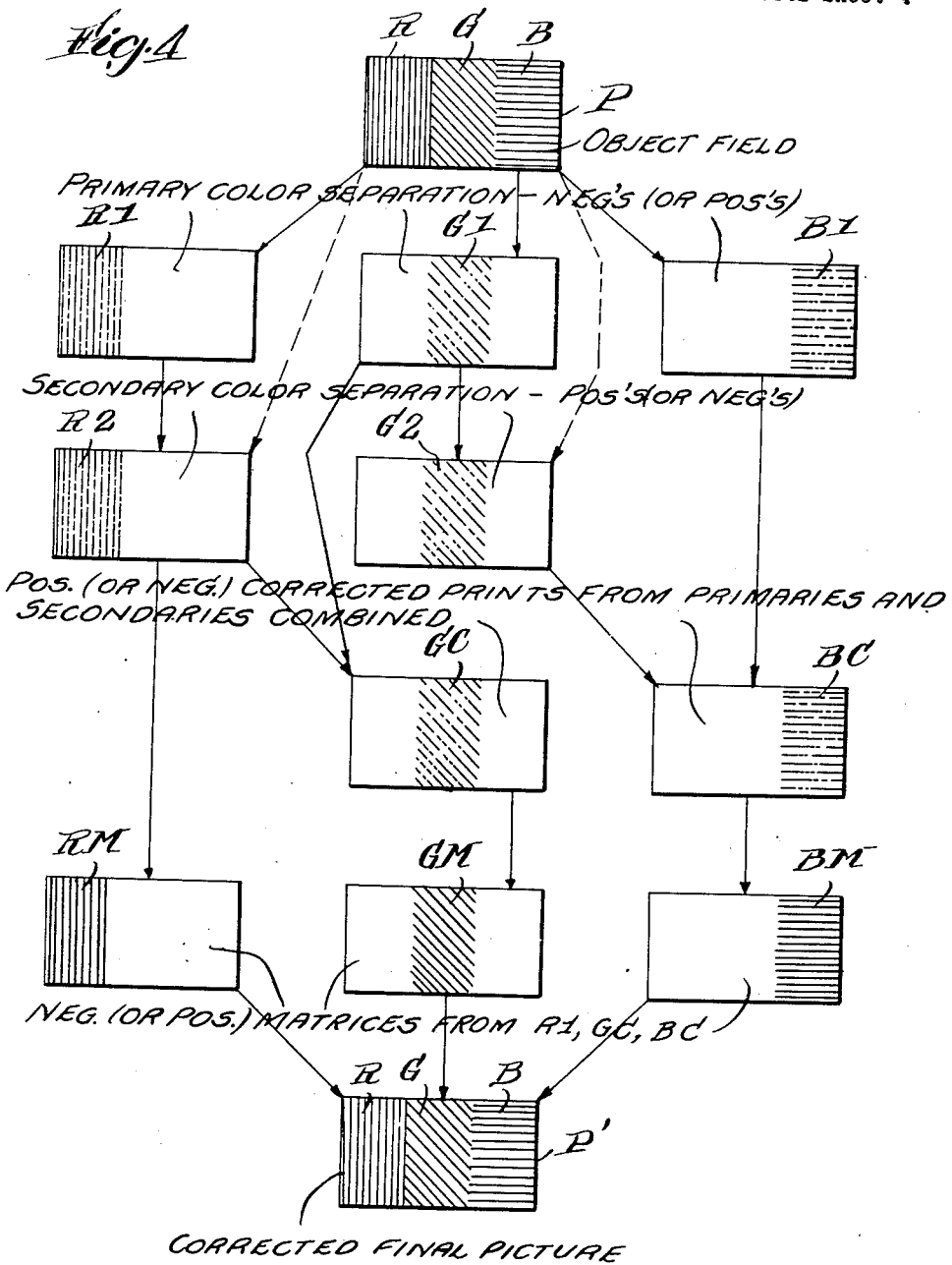

2,183,598

UNITED STATES PATENT OFFICE 2,183,598

MAKING COLOR PICTURES

Eastman A. Weaver, Winchester, Mass., assignor to Comstock & Wescott, Inc., Boston, Mass., a corporation of Massachusetts Application August 8, 1935, Serial No. 35,323

21 Claims. (Cl. 95—2)

This invention relates to color photography and more particularly to color photography of the subtractive type involving the use of a subtractive film which records the different color aspects of the scene throughout the same area, although in certain aspects the invention may be utilized with other types of film. A typical instance of subtractive color photography is the so-called monopack process where the negative or positive color aspects, or both, are photographically recorded on superimposed emulsions, compare for example United States Reissue Patent No. 18,680 or French Patent No. 797,400. Other subtractive processes employ separate color aspect negatives for example taken with the aid of light-dividing devices, the positives being made by photomechanically superimposing color aspect positive prints upon a suitable single carrier layer, compare for example United States Patent No. 1,978,979. It will be evident that these or similar processes can be combined for example, as is well known in the art, by deriving separate color aspect records from subtractive monopack records or from additive screen or lenticulated support records by copying through suitable filters, or on the other hand, by copying separate records onto film of the monopack type.

To make accurate three-color photographs without retouching, the coloring-matter of each of the three color aspects of the photograph should absorb only one-third of the spectrum without appreciable absorptivity for the remaining two-thirds. For example, an ideal cyan (minus red) would absorb red light but neither green nor blue, an ideal magenta (minus green) would absorb green light but neither red nor blue, and an ideal yellow (minus blue) would absorb blue light but neither red nor green. However, the available coloring-matters as for example the dyes specifically mentioned hereinafter, do not in general meet these ideal requirements. While there are yellow dyes which absorb little if any light other than blue, the best available magenta color absorbs considerable blue light as well as green and the best available cyan absorbs both green and blue light as well as red. Indeed I have found that one of the best non-fugitive cyan coloring-matters for absorbing red light has approximately 50% as much absorption of green light and approximately 25% as much absorption of blue light; and one of the best non-fugitive magenta for absorbing green light has approximately 50% as much absorption of blue light. Thus the best available cyan coloring-matter may be regarded as a mixture of ideal cyan and 50% as much ideal magenta and 25% as much ideal yellow, and the best available magenta as including 50% as much ideal yellow.

These imperfections alter the proportions in which the three colors must be used in order to obtain neutral balance, that is colorless whites, grays and blacks. For example if the cyan acts as though it contained 50% ideal magenta, the theoretical amount of magenta should be reduced 50%; and if each of the cyan and magenta pigments contributes 25% of the necessary yellow effect the theoretical amount of yellow should also be reduced 50%. While this method produces neutral balance in the whites, grays and blacks of the picture, the colored portions, especially the green portions, are dull.

Instead of applying a mere overall reduction of the amounts of absorption of the respective coloring matters in the records in which they are effective for producing the final positive print, the present application contemplates the reduction of these records (primary records) under control of other (secondary) records, namely those secondary or controlling records which correspond to coloring matters having undesirable absorption of the color ranges which are legitimately absorbed by the coloring-matters corresponding to said primary records; the amount of control being determined in peculiar manner by controlling the contrast values of the various records in accordance with the corrective effects desired. These contrast values are preferably derived directly from the above-explained defects of the coloring matters, and, in an important aspect of the invention, from the defects due not only to the reproduction coloring matters but also to the coloring matter of the original record (for example an original monopack record). For example, the yellow (blue absorbing) printing record (derived from the original blue color range) is reduced under control of the magenta printing (green absorbing) record for the purpose of compensating for the unwanted blue absorption of the magenta coloring matter. In other words, the blue absorbing effect of the magenta coloring matter is now used, together with the reduced blue absorption of the yellow coloring matter to furnish the desired correct amount of blue absorption. As indicated above, the imperfections of the original coloring matters may be included with those of the final picture in this compensation, as will be explained in detail hereinafter.

The principal object of the present invention is to correct for the inaccuracies of available coloring-matters and to counteract the aforesaid dulling effect on the colored portions of the picture. Other objects will appear from the following description and the appended claims.

According to the present invention different color aspects of the scene are produced in both positive and negative form and then recombined in such a way as to cancel out the unwanted absorption effects of the imperfect coloring-matter.

For the purpose of illustration typical embodiments of the invention are illustrated in the accompanying drawings in which Figs. 1 to 4 are diagrams of different processes and Fig. 1ᵃ is a diagrammatical representation of the coloring-matter defects.

In each of the figures P represents a picture of a red band R, a green band G and a blue band B; and P' represents a reproduction of the picture with the aforesaid corrections for the imperfections of the coloring-matters used in each stage of the process including, if desired, the imperfections of the coloring-matters employed in the original picture P. For example, the picture P may be a transparency of the monopack type in which the three color aspects are recorded respectively in three layers or strata of emulsion on a single support.

According to the process illustrated in Fig. 1 I may make a set of color separation prints R1, G1 and B1 of the red, green and blue aspects respectively from the color picture P by successively printing from the picture with red, green and blue light on three separate films respectively.

I may also make a set of prints G2 and B2 of the green and blue aspects from the prints G1 and B1 respectively or directly from the original picture P or one in one way and the other in the other way. In the latter case the print B1 is unnecessary and may be omitted. For convenience the images or records R1, G1 and B1 may be referred to as primaries and the images G2 and B2 as secondaries. As hereinafter pointed out, when printing both primaries and secondaries directly from the original picture, either the primaries or the secondaries are reversed in development so that one set is negative and the other set positive. A corrected print GC of the green aspect is then made by printing through R1 and G2 in superposition and, if a correction in the blue aspect is also desired, a corrected print of the blue aspect is made by printing through G1 and B2 in superposition. A master film M may then be formed by successively printing, (in registry on a single film of the monopack type for example), from R1, GC and BC, respectively, or, if no correction in the blue aspect is desired, from R1, GC and B1. If the master film be of the monopack type each of these three printings must of course be effected with light of wave length appropriate to the sensitivity of the strata in which the print is to be formed. The master film may be used as the final product of the process or it may be used as a stage product to form the final product P'. If the latter is also of the monopack type it may of course be printed directly from M with white light. When M is to be used as the final picture only two corrections need be made for imperfections of coloring-matter, one for the coloring-matter employed in the original picture P and one for the coloring-matter employed in the film M. When M is to be used as a corrected master to form the final picture P then it should have a third correction for the imperfection of the coloring-matter employed in P', that is M should be over-corrected not only to counteract the defects in itself and the picture P from which it is made but also the defects of the coloring-matter to be used in the final picture P' to be made from it.

The two images which are superposed to print each corrected image should be opposites, or of opposite sign, that is one negative and one positive. Thus, referring to Fig. 1, if R1 is negative G2 should be positive and vice versa and if G1 is negative B2 should be positive. By way of example R1, G1 and B1 may be negative and G2 and B2 positives. Moreover, as hereinafter more fully explained, the gamma of certain of the prints must be correlated with the absorption characteristics of the coloring-matter to be corrected for. In most cases it is also preferable to have the contrast of one of the superposed images (R1 and G2 for example) greater than that of the other. In this connection, it will be understood that these reproductions R1, G1, and B1, and generally speaking all reproductions, copies, or printings herein mentioned are produced by utilizing as far as possible only the substantially straight part of the curve representing the density-log exposure relation, or in other words, by working in the "correct exposure" region.

According to the procedure outlined in Fig. 1 the images R1, G1 and B1 may be developed to any suitable gamma $g_0$, as for example the usual gamma of approximately unity, the images G2 and B2 are each developed to a gamma of $$\frac{1}{1-(1-a)(1-b)(1-c)}=g$$

and the corrected images GC and BC are each developed to a gamma of $$\frac{1}{(1-a)(1-b)(1-c)}-1=g'$$

where $a$, $b$ and $c$ are constants depending upon the aforesaid deficiencies in absorptivity of the coloring-matter employed in the successive stages of the process. Thus if coloring-matter is used in three stages, for example in P, M and P' as illustrated in Fig. 1, then the constants $a$, $b$ and $c$ depend upon the deficiencies of the coloring-matter used in these three stages respectively. The constants for the different color aspects of each stage may differ; for example, the constants $a$ for the green and blue aspects of the first stage may differ. If coloring-matter is employed in only two stages or if the coloring-matter employed in one of the three stages does not have the aforesaid deficiency then the corresponding constant would be naught and the factor containing that constant, for example (1—c) would equal one. Likewise if coloring-matter is employed in only one stage or the coloring-matter employed in the other stage or stages does not have the aforesaid deficient absorptivity then two constants, for example $b$ and $c$ would be naught and the factors (1—b) and (1—c) for example would each equal one, in which case the aforesaid formulae would be equivalent to $$\frac{1}{1-(1-a)} \text{ and } \frac{1}{(1-a)}-1$$

respectively or, generally speaking, for any one stage, $$\frac{1}{d} \text{ and } \frac{d}{1-d}$$

The aforesaid constants are preferably determined as follows. From a negative comprising a series of known densities, a color print is made by the process and with the coloring-matter to be employed. For example, if the correction of a certain picture on paper is to be determined, the dyes in question are applied to the paper to be used, by means of the contemplate technique. Similarly in the case of a transparency, corresponding coloring matters, supports, and techniques are employed. The print densities are then measured through colored filters, first with that portion of the spectrum which the coloring-matter is intended to absorb and then with each of the other primary portions of the spectrum where absorption by this coloring-matter is not desired. From this data, characteristic curves are derived by plotting the reflection and/or transmission color component densities of the coloring matter of the respective print against the transmission density of the record from which that print was made. The gammas determined from these curves may be referred to as proper and improper gammas. For example, measurement of a particular cyan coloring-matter with a red filter may indicate a proper gamma of one, and measurement of the same coloring-matter with a green filter may indicate an improper gamma of one-half. A particular magenta coloring-matter measured in the same way may indicate a proper gamma of one-half when measured with a green light and an improper gamma of one-quarter when measured with blue light; when measured with red light it would ordinarily show no appreciable improper gamma inasmuch as the absorption bands of the best coloring-matters end sharply on the long-wave side though not on the short-wave side. The above-mentioned filters may be of the type generally in use for making color separation negatives, as for example listed in "Wratten Light Filters", eleventh edition, issued by the Eastman Kodak Company in 1932, as numbers 25, 58 and 47.

The aforesaid constants are the ratios of the improper gamma to the proper gamma of the dye being corrected for. From the aforesaid explanation of what is meant by proper and improper gammas it will be evident that the proper gamma is always greater than the improper gamma; consequently each of the constants $a$, $b$ and $c$ (ratio of improper gamma to proper gamma) is always less than one. If all three constants are zero then of course no correction would be necessary. Thus the constant for the green-color aspect is ½ over 1 which equals ½; and the constant for the blue-color aspect is ¼ over ½ which also equals ½. The aforesaid improper gamma of ¼, when measuring cyan with a blue filter, may be disregarded inasmuch as it so happens that, with the aforesaid cyan and largely with most other good cyan coloring-matters, this deficiency (which is relatively unimportant) is automatically corrected by the aforesaid correction for the green-color aspect.

If the same coloring-matters are employed in the successive stages then the constants $a$, $b$ and $c$ for each color aspect would of course be the same; otherwise they may be separately determined as above described.

In this connection it will be noted that the relative average densities of the combined records are of quite subordinate importance and indeed not at all controlling as far as the compensation of imperfect properties of coloring matters is concerned,—for the following reasons well known in the photographic art. The average density of photographic reproductions can be increased at will without in any way affecting the resulting print; only the necessary printing exposure has to be varied to obtain identical prints from printing records of varying overall densities. On the contrary, if the contrast of a record is changed, for example by different development, or by reduction or intensification, the character of the resulting print is altered substantially regardless of the exposure time. Hence, the character of the prints is substantially changed only by altering contrast values, whereas the adding of overall densities merely affects the required printing exposure.

In three-color processes the coloring-matters are ordinarily balanced so that equal superposed printings of the three produce neutral shades. This condition of neutral balance is attained when the sum of the red-light gammas of the three coloring-matters, the sum of the green-light gammas and the sum of the blue-light gammas are equal to each other. In correcting for deficiency of coloring-matters according to this invention this balanced condition is maintained.

While there are many well-known pure yellow dyes which require no correction I prefer alizarin saphirol B (C. I. 1054) for the blue and alizarin rubinol (C. I. 1091) for magenta. For each of these dyes the constants ($a$, $b$ and $c$ in Fig. 1) are each approximately one-half. Thus for single, double and triple corrections the gamma $g$ of G2 and B2 and the gammas $g'$ of GC and BC are:

| Gammas | single | double | triple |
|---|---|---|---|
| $g$ | 2 | 4/3 | 8/7 |
| $g'$ | 1 | 3 | 7 |

Gamma values as high as 7 or 8, although hardly procurable by development alone, can be obtained by well known methods of intensification, as for example described in Clerc, "Photography, Theory and Practice", 1930, Greenwood & Co., Ltd., page 296.

The modification illustrated in Fig. 2 is similar to that shown in Fig. 1 except in that the corrected print GC′ of the green aspect is made from the secondary red-aspect print R2 and the primary green-aspect print G1 instead of the primary red-aspect R1 and the secondary green-aspect G2. Here again G2 and B2 may be printed either from G1 and B1 respectively, or directly from P, the primary and secondary prints must be opposites as above defined, and it is preferable to have different degrees of contrast for the two prints which are to be superposed in making the corrected prints. While the gammas of the primary images R1, G1 and B1 are preferably unity as in Fig. 1, the gammas $g$ of the secondary images R2 and G2 and the gammas $g'$ of the corrected prints GC′ and BC′, respectively, are preferably:

$$g = 1 - (1-a)(1-b)(1-c)$$

$$g' = \frac{1}{(1-a)(1-b)(1-c)}$$

When employing the aforesaid dyes according to Fig. 2 the gammas for single, double and triple correction are:

| Gammas | single | double | triple |
|---|---|---|---|
| $g$ | 1/2 | 3/4 | 7/8 |
| $g'$ | 2 | 4 | 8 |

The modifications illustrated in Figs. 3 and 4 are similar to those shown in Figs. 1 and 2 respectively except in that the master film M is replaced by matrices RM, GM and BM for printing the final picture P' by imbibition. The red-aspect matrix RM is printed from RI, the green-aspect matrix GM from the corrected green-aspect print GC and the blue-aspect matrix BM from the corrected blue-aspect print BC. In these processes only double correction is required inasmuch as coloring-matters are used only in two stages (P and P').

In some cases it is preferable to make both primary and secondary prints (e. g. RI and G2), which are to be superposed in making a corrected print (e. g. GC), directly from the original (e. g. P), developing one by reversal so that one is a negative and the other is a positive. For example, when using film which shrinks and expands, images may be more easily caused to register if the production of the two involves the same number of wet processes respectively, whereas if RI be made directly from P and G2 be made indirectly through the medium of GI then the size of G2 may differ from that of RI because of the shrinkage of GI in addition to that of itself (G2).

From the foregoing it will be understood that when there is available only a color photograph having the aforesaid deficiency of coloring-matter, in reproducing the photograph a corresponding deficiency in the reproduction may not only be avoided but the deficiency of the original may be corrected in making the reproduction according to this invention. It will also be understood that the second and third corrections herein referred to are preferably effected in the same operation as the first correction merely by changing the gammas as described. It will also be understood that the aforesaid primary, secondary and corrected prints may be black-and-white prints.

It should be understood that the present disclosure is for the purpose of illustration only and that this invention includes all modifications and equivalents which fall within the scope of the appended claims.

I claim:

1. The method of producing a color picture of the subtractive type involving for the reproduction of the red color aspect the use of cyan dye properly absorbing red light but deficient because improperly absorbing green light, which method comprises forming a color separation image of the red aspect of the picture, forming a color-separation image of the green aspect of the picture, one image being negative and the other positive and one image having greater contrast than the other, and forming a set of images including a green-aspect image printed from both said images, for making imbibition prints with said dyes, the gammas of said first and second green-aspect images being approximately two to one.

2. The method of reproducing a color picture of the subtractive type involving the use in three stages, namely, in said picture, in an intermediate step, and for the final reproduction of a color aspect, of coloring-matter defective because absorbing light which should only be absorbed by coloring matter corresponding to another aspect, which method comprises forming a color separation print of the red aspect of the pictures, forming a color-separation print of the green aspect of the picture, one print comprising a negative and the other a positive and one print having greater contrast than the other, and forming a corrected green-aspect print from said prints, the gamma of said green-aspect print being approximately $$\frac{1}{1-(1-a)(1-b)(1-c)}$$

and the gamma of said corrected green-aspect print being approximately $$\frac{1}{(1-a)(1-b)(1-c)}-1$$

where $a$, $b$ and $c$ are constants representing the ratios of gammas for said stages with respect to light improperly absorbed by said defective coloring-matter, to the corresponding gammas with respect to light properly absorbed by that coloring-matter.

3. The method of reproducing a color picture of the subtractive type involving the use in three stages, namely, in said picture, in an intermediate step, and for the final reproduction of a color aspect, of coloring-matter defective because absorbing light which should only be absorbed by coloring matter corresponding to another aspect, which method comprises forming a color separation print of the red aspect of the picture, forming a color-separation print of the green aspect of the picture, one print comprising a negative and the other a positive and one print having greater contrast than the other, and forming a corrected green-aspect print from said prints, the gamma of said red-aspect print being approximately $1-(1-a)(1-b)(1-c)$ and the gamma of said corrected green-aspect print being approximately $$\frac{1}{(1-a)(1-b)(1-c)}$$

where $a$, $b$ and $c$ are constants representing the ratios of gammas for said stages with respect to light improperly absorbed by said defective coloring-matter, to the corresponding gammas with respect to light properly absorbed by that coloring-matter.

4. The method of reproducing a color picture of the subtractive type involving the use in three stages, namely in said picture, in an intermediate step, and for the final reproduction of a color aspect, of coloring-matter defective because absorbing light which should only be absorbed by coloring matter corresponding to another aspect, which method comprises forming a set of color-separation primaries of the red, green and blue aspects respectively, printing a set of color-separation secondaries of the green and blue aspects, one set comprising negatives and the other positives and one set having greater contrast than the other, forming a corrected green-aspect print from the red primary and the green secondary and forming a corrected blue-aspect print from the green primary and the blue secondary, the gammas of said secondaries being approximately $$\frac{1}{1-(1-a)(1-b)(1-c)}$$

and the gammas of said corrected prints being approximately $$\frac{1}{(1-a)(1-b)(1-c)}-1$$

where $a$, $b$ and $c$ are constants representing the ratios of gammas for said stages with respect to light improperly absorbed by said defective coloring-matter, to the corresponding gammas with respect to light properly absorbed by that coloring-matter.

5. The method of reproducing a color picture of the subtractive type involving the use in three stages, namely in said picture, in an intermediate step, and for the final reproduction of a color aspect, of coloring-matter defective because absorbing light which should only be absorbed by coloring matter corresponding to another aspect, which method comprises forming a set of color separation primaries of the red, green and blue aspects respectively, printing a set of color-separation secondaries of the green and blue aspects, one set comprising negatives and the other positives and one set having greater contrast than the other, forming a corrected green-aspect print from the red primary and the green secondary and forming a corrected blue-aspect print from the green primary and the blue secondary, the gammas of said secondaries being approximately $1-(1-a)(1-b)(1-c)$ and the gammas of said corrected print being approximately $$\frac{1}{(1-a)(1-b)(1-c)}$$

where $a$, $b$ and $c$ are constants representing the ratios of gammas for said stages with respect to light improperly absorbed by said defective coloring-matter, to the corresponding gammas with respect to light properly absorbed by that coloring-matter.

6. The method of making a reproduction of a color picture of the subtractive type, the red color aspect of which picture is made with cyan coloring-matter properly absorbing the red portion of the spectrum but deficient because having an improper absorptivity for green light which should only be absorbed by the magenta coloring-matter corresponding to the green color aspect, which method comprises forming a color-separation print of the red aspect of the picture, forming a color-separation print of the green aspect of the picture, the prints being produced by substantially correct exposures, one print comprising a negative and the other a positive, forming a corrected green-aspect print from said prints, and making said reproduction with said corrected print, the contrast-ratio of said prints being made proportionate to said coloring-matter deficiency whereby at each point of said reproduction as magenta coloring matter is subtracted as is equivalent to the improper absorptivity for green light of said cyan coloring-matter at said point, more accurately to reproduce the colors of the original scene.

7. The method of producing a color picture of the subtractive type involving the use of cyan dye corresponding to the red color as aspect and properly absorbing red light but deficient because improperly absorbing green light which should only be absorbed by magenta dye corresponding to the green color aspect, which method comprises forming a color-separation image of the red aspect of the picture, forming a color-separation image of the green aspect of the picture, the prints being produced by substantially correct exposures, one image being negative and the other positive and the green-aspect image having greater contrast than the red-aspect image, and forming a set of images, including a green-aspect image printed from both said images, for making imbibition prints with said dyes, the ratio of the contrast value of said red-aspect color-separation image to that of said green-aspect image being made proportionate to said dye deficiency, more accurately to reproduce the colors of the original scene.

8. The method of reproducing a color picture of the subtractive type the red color aspect of which is made with cyan coloring-matter properly absorbing red light but deficient because absorbing green light which should only be absorbed by magenta coloring-matter corresponding to the green color aspect, and the green color aspect of which is made with magenta coloring-matter properly absorbing green light but deficient because absorbing blue light which should only be absorbed by yellow coloring-matter corresponding to the blue aspect, which method comprises printing from the picture a set of color-separation primaries of the red, green and blue aspects respectively, printing a set of color-separation secondaries of the green and blue aspects, one set comprising negatives and the other positives and the secondaries having greater contrast than the primaries, forming a corrected green-aspect print from the red primary and the green secondary and forming a corrected blue-aspect print from the green primary and the blue secondary, the contrast-ratio of the said primary and secondary prints being made proportionate to said coloring matter deficiencies in said color picture, more accurately to reproduce the colors of the original scene.

9. The method of producing color pictures of the subtractive type involving the use of cyan dye corresponding to the red color aspect and properly absorbing red light but deficient because absorbing green light which should only be absorbed by magenta dye corresponding to the green color aspect, and for the green color aspect of magenta dye properly absorbing green light but deficient because improperly absorbing blue light which should only be absorbed by yellow dye corresponding to the blue color aspect, which method comprises forming a set of color-separation primaries of the red, green and blue aspects respectively, printing a set of color-separation secondaries of the green and blue aspects, one set being negatives and the other positives, and forming a set of image records, including one from the red primary and the green secondary and one from the green primary and the blue secondary, for making imbibition prints with said dyes, the contrast-ratio of said primaries and images being made proportionate to said dye deficiencies, more accurately to reproduce the colors of the original scene.

10. The method of producing color pictures of the subtractive type involving the use of cyan dye corresponding to the red color aspect and properly absorbing red light but deficient because absorbing green light which should only be absorbed by magenta dye corresponding to the green color aspect and for the green color aspect of magenta dye properly absorbing green light but deficient because absorbing blue light which should only be absorbed by yellow dye corresponding to the blue color aspect, which method comprises forming a set of color-separation primary images of the red, green and blue aspects respectively, printing a set of color-separation secondary images of the green and blue aspects, one set being negatives and the other positives and one set having greater contrast than the other, and forming a set of corrected image records, including one from the red primary and the green secondary images, and one from the green primary and the blue secondary images, for making imbibition prints with said dyes, all of said images being substantially confined to the straight line portions of the characteristic curves and the ratio of contrast values of said primary and corrected images being made proportionate to said dye deficiencies, more accurately to reproduce the colors of the original scene.

11. The method of making an accurate reproduction of an object field with the aid of color aspect records, by using several coloring-matters, at least one coloring-matter being deficient because having an improper absorptivity for light of a color which should properly only be absorbed by a second coloring-matter corresponding to another color aspect, which method comprises the steps of producing positive and negative prints of different color aspects including those corresponding to said coloring-matters, the contrast values of said positive and negative prints, respectively, being made proportionate to said proper and improper absorptivities of said coloring-matter, and producing a composite record from one of said positive prints of one color aspect and one of said negative prints of another color aspect, thereby subtracting at each point of the reproduction as much of said second coloring-matter density as corresponds to said improper absorption at that point by said first coloring-matter.

12. The method of producing a corrected color picture of an object field with the aid of color aspect records made with several aqueous dyes respectively, at least one of said dyes being deficient because having improper absorptivity for light of a color which should properly only be absorbed by a second dye corresponding to another color aspect, which method comprises the steps of producing positive and negative prints of different color aspects including those corresponding to said dyes, the contrast values of said positive and negative prints, respectively, being made proportionate to said proper and improper absorptivity, producing a composite record from one of said positive prints of one color aspect and one of said negative prints of another color aspect, said contrast value relation subtracting, at each point of the color picture, as much density from the aspect corresponding to said second dye as corresponds to said improper absorption at that point by said first dye, and with said composite record producing an imbibition print of said color aspects with aqueous dyes.

13. The method of making a corrected color reproduction of an object field by using for at least one color aspect deficient coloring-matter having an improper color absorption range so that its absorption does not approximately correspond to the exposure range of that aspect, which method comprises the steps of forming in a plurality of stages records in such coloring-matter, forming, with ratio of contrast values proportionate to the degree of said improper absorption, records of opposite sign of two different color aspects, and printing from said records in registered combination a corrected record, said contrast values compensating at least partly for said absorption deficiency.

14. The method of producing a corrected reproduction of a color photograph, at least one aspect of the photograph, and the corresponding aspect of the reproduction being made with deficient coloring-matter having an improper color absorption range so that its absorption does not approximately correspond to the exposure range of that aspect, which method comprises the steps of forming color-separation records of different color aspects of said picture and printing a corrected record from a registered combination of records of opposite sign of two different color aspects and formed with ratio of contrast values proportionate to the degree of said improper absorption, said contrast values compensating at least partly for said absorption deficiencies.

15. The method of making a corrected color reproduction of an object field by using for at least one color aspect deficient coloring-matter having an improper color absorption range so that its absorption does not approximately correspond to the exposure range of that aspect, which method comprises the steps of forming records of different color, printing a master record from a registered combination of records of opposite sign of at least two different color aspects formed with ratio of contrast values proportionate to the degree of said improper absorption in said reproduction as well as in said master record, and making a combined color picture with said master record. said contrast values compensating in said master record for said absorption deficiency in said master record as well as in said picture.

16. The method of reproducing an object field with the aid of color aspect records, involving in one of its stages, the use for a color aspect of coloring matter deficient because having improper absorptively for light of a color which should properly only be absorbed by coloring matter corresponding to another aspect, which method comprises forming a color separation print of said aspect involving the use of defective coloring matter, forming a color separation print of said other aspect, one print comprising a negative and the other a positive and one print having greater contrast than the other, and forming from said prints a corrected reproduction of said other aspect, the gamma of said print of said other aspect being approximately $$\frac{1}{d}$$

where $d$ is a constant representing the ratio of the improper absorptivity of said coloring-matters.

17. The method of reproducing an object field with the aid of color aspect records, involving in one of its stages, the use for a color aspect of coloring matter deficient because having improper absorptivity for light of a color which should properly only be absorbed by coloring matter corresponding to another aspect, which method comprises forming a color separation print of said aspect involving the use of defective coloring matter, forming a color separation print of said other aspect, one print comprising a negative and the other a positive and one print having greater contrast than the other, and forming from said prints a corrected reproduction of said other aspect, the gamma of said print of said other aspect being approximately $d$ where $d$ is a constant representing the ratio of the gamma for the stage in question, with respect to light improperly absorbed by said deficient coloring matter, to the corresponding gamma with respect to light properly absorbed by said defective coloring matter.

18. The method of reproducing a color picture of the subtractive type involving the use in three stages, namely, in said picture, in an intermediate step, and for the final reproduction of a color aspect, of coloring-matter defective because absorbing light which should only be absorbed by coloring-matter corresponding to another aspect, which method comprises forming a color separation print of the red-aspect of the pictures, forming a color-separation print of the green-aspect of the picture, one print comprising a negative and the other a positive, the red-aspect print having greater contrast than the other in the ratio $$\frac{1}{1-(1-a)(1-b)(1-c)}$$

and forming a corrected green-aspect print from said prints, where $a$, $b$ and $c$ are constants representing the ratios of improper to proper absorptivities of the coloring-matter used in said stages.

19. The method of reproducing a color picture of the subtractive type involving the use in three stages, namely, in said picture, in an intermediate step, and for the final reproduction of a color aspect, of coloring-matter defective because absorbing light which should only be absorbed by coloring-matter corresponding to another aspect, which method comprises forming a color separation print of the red-aspect of the picture, forming a color separation print of the green-aspect of the picture, one print comprising a negative and the other a positive and the red-aspect print having a greater contrast than the other, in the ratio $$\frac{1}{1-(1-a)(1-b)(1-c)}$$

and forming a corrected green-aspect print from said prints, where $a$, $b$ and $c$ are constants representing the ratios of improper to proper absorptivities for the coloring-matters.

20. The method of reproducing a color picture of the subtractive type involving the use in three stages, namely in said picture, in an intermediate step, and for the final reproduction of a color aspect, of coloring-matter defective because absorbing light which should only be absorbed by coloring-matter corresponding to another aspect, which method comprises forming a set of color separation primaries of the red, green and blue aspects respectively, printing a set of color separation secondaries of the green and blue aspects, one set comprising negatives and the other positives and one set having greater contrast than the other, forming a corrected green-aspect print from the red primary and the green secondary and forming a corrected blue-aspect print from the green primary and the blue secondary, the gammas of said secondaries being approximately $$\frac{1}{1-(1-a)(1-b)(1-c)}$$

where $a$, $b$ and $c$ are constants representing the ratios of gammas for said stages with respect to light improperly absorbed by said defective coloring-matter, to the corresponding gammas with respect to light properly absorbed by that coloring-matter.

21. The method of reproducing a color picture of the subtractive type involving the use in three stages, namely in said picture, in an intermediate step, and for the final reproduction of a color aspect, of coloring-matter defective because absorbing light which should only be absorbed by coloring-matter corresponding to another aspect, which method comprises forming a set of color separation primaries of the red, green and blue aspects respectively, printing a set of color separation secondaries of the green and blue aspects, one set comprising negatives and the other positives and one set having greater contrast than the other, forming a corrected green-aspect print from the red primary and the green secondary and forming a corrected blue-aspect print from the green primary and the blue secondary, the gammas of said secondaries being approximately $1-(1-a)(1-b)(1-c)$, where $a$, $b$ and $c$ are constants representing the ratios of gammas for said stages with respect to light improperly absorbed by said defective coloring-matter, to the corresponding gammas with respect to light properly absorbed by that coloring-matter.

EASTMAN A. WEAVER.